(12) United States Patent
Embleton et al.

(10) Patent No.: US 11,230,221 B2
(45) Date of Patent: *Jan. 25, 2022

(54) STRUCTURE AND METHOD FOR SECURING AND TRANSPORTING EQUIPMENT RACKS

(71) Applicant: DELL PRODUCTS, L.P., Round Rock, TX (US)

(72) Inventors: Steven Embleton, Austin, TX (US); James D. Curlee, Round Rock, TX (US); Rene J. Salas, Round Rock, TX (US); Joseph A. Bartole, Hutto, TX (US); Bruce E. Lykins, Round Rock, TX (US); Eric M. Tunks, Austin, TX (US); Joshua S. Keup, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 140 days.

This patent is subject to a terminal disclaimer.

(21) Appl. No.: 15/989,250

(22) Filed: May 25, 2018

(65) Prior Publication Data

US 2018/0272917 A1     Sep. 27, 2018

Related U.S. Application Data

(62) Division of application No. 15/348,953, filed on Nov. 10, 2016, now Pat. No. 10,023,099.

(51) Int. Cl.
*B60P 7/08* (2006.01)
*B60P 7/15* (2006.01)
(Continued)

(52) U.S. Cl.
CPC ............... *B60P 7/15* (2013.01); *B60P 1/649* (2013.01); *B60P 1/6481* (2013.01);
(Continued)

(58) Field of Classification Search
CPC ...... B60P 7/15; B60P 7/18; B60P 7/16; B60P 7/13; B60P 7/0892; B60P 1/649;
(Continued)

(56) References Cited

U.S. PATENT DOCUMENTS 3,073,260 A     1/1963   Dunlap
4,273,485 A     6/1981   Fischer et al.
(Continued)

*Primary Examiner* — Stephen T Gordon
(74) *Attorney, Agent, or Firm* — Isidore PLLC

(57) ABSTRACT

A clamping device secures an equipment rack during shipping. The clamping device includes a gripping portion having first and second surfaces positionable along opposing sides of a respective one of a front and rear lateral logistic bar. The clamping device also includes a clamp mechanism attached to the gripping portion for movement between a disengaged position and an engaged position to selectively engage the first and second surfaces to the opposing sides of the respective one of the front and rear lateral logistic bars positioned adjacent to an equipment rack within a carrier shipping enclosure. A mounting feature is attached to the gripping portion to hold one end of a longitudinal logistic bar positioned along a lateral side of the equipment rack.

7 Claims, 10 Drawing Sheets

(51) Int. Cl.
  B60P 7/10 (2006.01)
  B65D 90/00 (2006.01)
  B60P 7/135 (2006.01)
  B60P 1/64 (2006.01)
  B60P 7/13 (2006.01)
  B62D 33/02 (2006.01)
  B60P 7/16 (2006.01)
  B62D 33/04 (2006.01)
  B60P 7/18 (2006.01)
  B65D 81/05 (2006.01)
  B65D 88/12 (2006.01)
  B65D 19/44 (2006.01)
  B65D 85/62 (2006.01)
  B65D 67/02 (2006.01)

(52) U.S. Cl.
  CPC ............... B60P 7/0892 (2013.01); B60P 7/10 (2013.01); B60P 7/13 (2013.01); B60P 7/135 (2013.01); B60P 7/16 (2013.01); B60P 7/18 (2013.01); B62D 33/02 (2013.01); B62D 33/0207 (2013.01); B62D 33/042 (2013.01); B65D 19/44 (2013.01); B65D 67/02 (2013.01); B65D 81/053 (2013.01); B65D 81/054 (2013.01); B65D 81/055 (2013.01); B65D 85/62 (2013.01); B65D 88/129 (2013.01); B65D 90/004 (2013.01); B65D 90/0006 (2013.01); B65D 90/0053 (2013.01); B65D 90/0066 (2013.01); B65D 90/0073 (2013.01)

(58) Field of Classification Search
  CPC ...... B60P 1/6481; B60P 7/10; B65D 90/0066; B65D 90/0073; B65D 90/004; B65D 90/0006; B65D 67/02; B65D 81/054; B65D 85/62; B65D 19/44; B65D 81/055; B65D 88/129; B65D 81/053; B65D 90/0053; B65D 88/00; B62D 33/046; B62D 33/02; B62D 33/042; B62D 33/04; B62D 33/0207
  USPC ....... 410/121, 120, 129, 130, 140, 143, 150, 410/151, 153, 152
  See application file for complete search history.

(56) References Cited

U.S. PATENT DOCUMENTS

| | | | |
|---|---|---|---|
| 4,626,017 | A | 12/1986 | Robertson |
| 5,018,918 | A | 5/1991 | Jacobs |
| 5,823,349 | A | 10/1998 | Bridges |
| 5,997,228 | A | 12/1999 | Potter |
| 6,042,312 | A | 3/2000 | Claude |
| 6,068,433 | A | 5/2000 | Baloga |
| 6,238,154 | B1 * | 5/2001 | DaPrato .................... B60P 7/15 410/121 |
| 6,755,600 | B2 | 6/2004 | Scott |
| 7,334,973 | B2 | 2/2008 | Scott |
| 7,410,335 | B2 * | 8/2008 | Scott ......................... B60P 7/15 410/121 |
| 8,002,128 | B2 | 8/2011 | Kem et al. |
| 9,393,896 | B1 | 7/2016 | Squyres |
| 9,422,083 | B1 | 8/2016 | Embleton et al. |
| 10,023,099 | B2 * | 7/2018 | Embleton ................. B60P 7/15 |
| 2003/0161700 | A1 * | 8/2003 | Moore .................. B61D 45/006 410/102 |
| 2005/0254918 | A1 * | 11/2005 | Smits ......................... B60P 7/15 410/121 |
| 2008/0131226 | A1 | 6/2008 | Pesson |
| 2008/0131227 | A1 | 6/2008 | Maresh et al. |
| 2011/0318133 | A1 | 12/2011 | Arnold |
| 2013/0064621 | A1 | 3/2013 | Wang |
| 2016/0082875 | A1 | 3/2016 | Squyres |

* cited by examiner

STRUCTURE AND METHOD FOR SECURING AND TRANSPORTING EQUIPMENT RACKS

RELATED APPLICATION

This application is a divisional of U.S. patent application Ser. No. 15/348,953, filed Nov. 10, 2016, the content of which is fully incorporated herein by reference.

BACKGROUND

1. Technical Field

This disclosure generally relates to shipping of information handling systems (IHSs), and more particular to securing palletized IHSs during shipping.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An Original Equipment Manufacturer (OEM) of rack-mounted IHSs can ship hundreds of fully integrated racks a year. Each rack can contain up to $1M of Information Technology (IT) hardware. Each rack can range in weight from as little as 700 lbs to over 4500 lbs. These fully integrated racks are required to survive the transportation environment worldwide, by truck, plane, boat, or other transportation medium. The fully integrated rack is generally shipped on a shock pallet as the primary protection for the IT hardware in the rack. Pallets are small, low, portable platforms on which goods are placed for storage in a warehouse or moving on a vehicle. Shock pallets include dampening elements to absorb vibrations to lessen damage to the IT hardware. Generally, each loaded rack shock pallet is spaced apart from other loaded rack shock pallets in the storage container or trailer in order to distribute the weight. Racks can be 48 rack units (U) or even 52 U high (2.3 m), with one rack unit being 1.75 inches (44.45 mm) high.

Tipping of a loaded rack shock pallet during transport poses a significant risk of loss. Straps are generally used to tether the racks within a shipping container or trailer to prevent tipping. However, proper attachment relies upon the experience of human operators to attach the straps. Frequently, damage arises due to straps that are too tight, crushing a cabinet or external hardware of the rack. Damage also occurs from straps being too loose, allowing the rack to gain momentum in response to an impact or shift in a orientation of a carrier. The time required to properly attach the straps can also be considerable.

As an improvement over strapping to an exposed rack, a wooden or corrugated shell is often used to encompass the rack. Strapping to a shell rather than the rack avoids a tendency otherwise to damage cable management brackets extending from the rack face. The shell also assists in limiting movement in the truck or other conveyance during transportation from an integrator to the customer. Generally the rack is constrained to the pallet deck at the rack base. Any impact parallel to the pallet will cause the rack to sway gathering momentum at a rack top. Without a shell, when the rack top impacts the truck wall or another rack, the momentum is usually sufficient to cause significant damage. The shells help to mitigate this type of damage by eliminating space between the rack top and surrounding impediments. Movement of the rack is minimized to prevent momentum from building up that can cause damage.

Generally these conventional solutions cost approximately $100 per use. The wooden shells are heavy, often taking three to four people to move safely. The corrugated and wooden shell solutions require valuable logistical time when installing the racks at the customer site. The corrugated and wooden shell solutions take up a lot of space when they are not being used and thus incur storage costs. Changes in racks often require respective updates to the wood and corrugated shell solutions taking up to three months of additional design and testing.

BRIEF SUMMARY

The illustrative embodiments of the present disclosure provide a shipping apparatus that utilizes logistic bars attached laterally across a carrier shipping enclosure such as truck trailer or shipping container to facilitate secure transportation of information handling system (IHS) racks. The logistic bars can engage tracks attached to lateral sidewalls of the carrier shipping enclosure. For clarity, directions used herein refer to a rear opening enclosure that is loaded from the front to the back. One or more equipment racks are positioned behind one of the lateral logistic bars. Another logistic bar is placed behind the one or more equipment racks. Each of the equipment racks are secured in place by clamping devices positioned along a respective lateral logistic bar to be proximate to a respective corner of the equipment rack. Longitudinal logistic bars are engaged to a pair of the clamping devices that are on the same side of the equipment rack. The shipping apparatus provides a rigid structure that is appropriately positioned around the perimeter of the equipment rack without crushing the equipment rack. The rigid structure also prevents swaying of the equipment rack during transport.

In one aspect of the present disclosure, a shipping apparatus includes a front lateral logistic bar and a rear lateral logistic bar. Each lateral logistic bar has a length to perpendicularly extend between opposing lateral interior sides of a carrier shipping enclosure. The shipping apparatus includes four clamping devices, a front left and right pair mountable on the front lateral logistic bar and a rear left and right pair mountable on the rear lateral logistic bar. Each clamping device is placed proximate to a respective corner of an equipment rack placed in the carrier shipping enclosure for shipment. Each clamping device includes a gripping portion having first and second surfaces positionable along opposing sides of a respective one of the front and the rear lateral logistic bar. Each clamping device includes a clamp mechanism attached to the gripping portion for movement between a disengaged position and an engaged position. Based upon a position of the clamping mechanism, the first and second surfaces selectively engage the opposing sides of the respective one of the front and the rear lateral logistic bars. Each clamping device includes a mounting feature attached to the gripping portion. The clamping device can be positioned so that the mounting feature is oriented toward a mounting feature of another one of the four clamping devices positioned on the other one of the front and rear lateral logistic bars on a same lateral side of the equipment rack. The shipping apparatus includes a pair of left and right longitudinal logistic bars. Each longitudinal logistic bar has a length that perpendicularly extends between respective mounting features of the two clamping devices on the same lateral side of the equipment rack.

According to at least one aspect of the present disclosure, a clamping device is provided for securing an equipment rack during shipping. In one or more embodiments, the clamping device includes a gripping portion having first and second surfaces positionable along opposing sides of a respective one of a front and a rear lateral logistic bar. Each clamping device includes a clamp mechanism attached to the gripping portion for movement between a disengaged position and an engaged position. Based upon a position of the clamping mechanism, the first and second surfaces selectively engage the opposing sides of the respective one of the front and the rear lateral logistic bars. Each clamping device includes a mounting feature attached to the gripping portion. The clamping device can be positioned so that the mounting feature is oriented toward a mounting feature of a longitudinally-aligned one of the four clamping devices. The longitudinally-aligned clamping device is positioned on the corresponding/remaining other one of the front and rear lateral logistic bars on a same lateral side of the equipment rack.

Thus, a pair of lateral logistic bars are positioned across a front side and across a back side respectively of a selected equipment rack. A left longitudinal logistic bar is against a left lateral side of the equipment rack. A right longitudinal logistic bar is positioned against a right lateral side of the equipment rack. A front left clamping device that grips the front lateral logistic bar holds a front end of the left longitudinal logistic bar. A rear left clamping device that grips the rear lateral logistic bar holds a rear end of the left longitudinal logistic bar. The front left clamping device, the left longitudinal logistic bar, and the rear left clamping device are all on the left lateral side of the equipment rack. A right longitudinal logistic bar is positioned against a right lateral side of the equipment rack. A front right clamping device that grips the front lateral logistic bar holds a front end of the right longitudinal logistic bar. A rear right clamping device that grips the rear lateral logistic bar holds a rear end of the right longitudinal logistic bar. The front right clamping device, the right longitudinal logistic bar, and the rear right clamping device are all on the right lateral side of the equipment rack.

According to at least one aspect of the present disclosure, a method is provided of making a shipping apparatus for securing an equipment rack. In one or more embodiments, the method includes making a gripping portion of a clamping device having first and second surfaces positionable along opposing sides of a respective one of a pair of front and rear lateral logistic bars. The method includes attaching a clamp mechanism of the clamping device to the gripping portion for selective movement between a disengaged position and an engaged position. In the engaged position, the clamp mechanism engages the first and second surfaces to the opposing sides of the respective one of the front and rear lateral logistic bars. The respective lateral logistic bar is positioned adjacent to an equipment rack within a carrier shipping enclosure. The method includes attaching a mounting feature to the gripping portion to hold one end of a longitudinal logistic bar positioned along a lateral side of the equipment rack. The other end of the longitudinal logistic bar has a mounting feature that is engaged in another clamping device.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
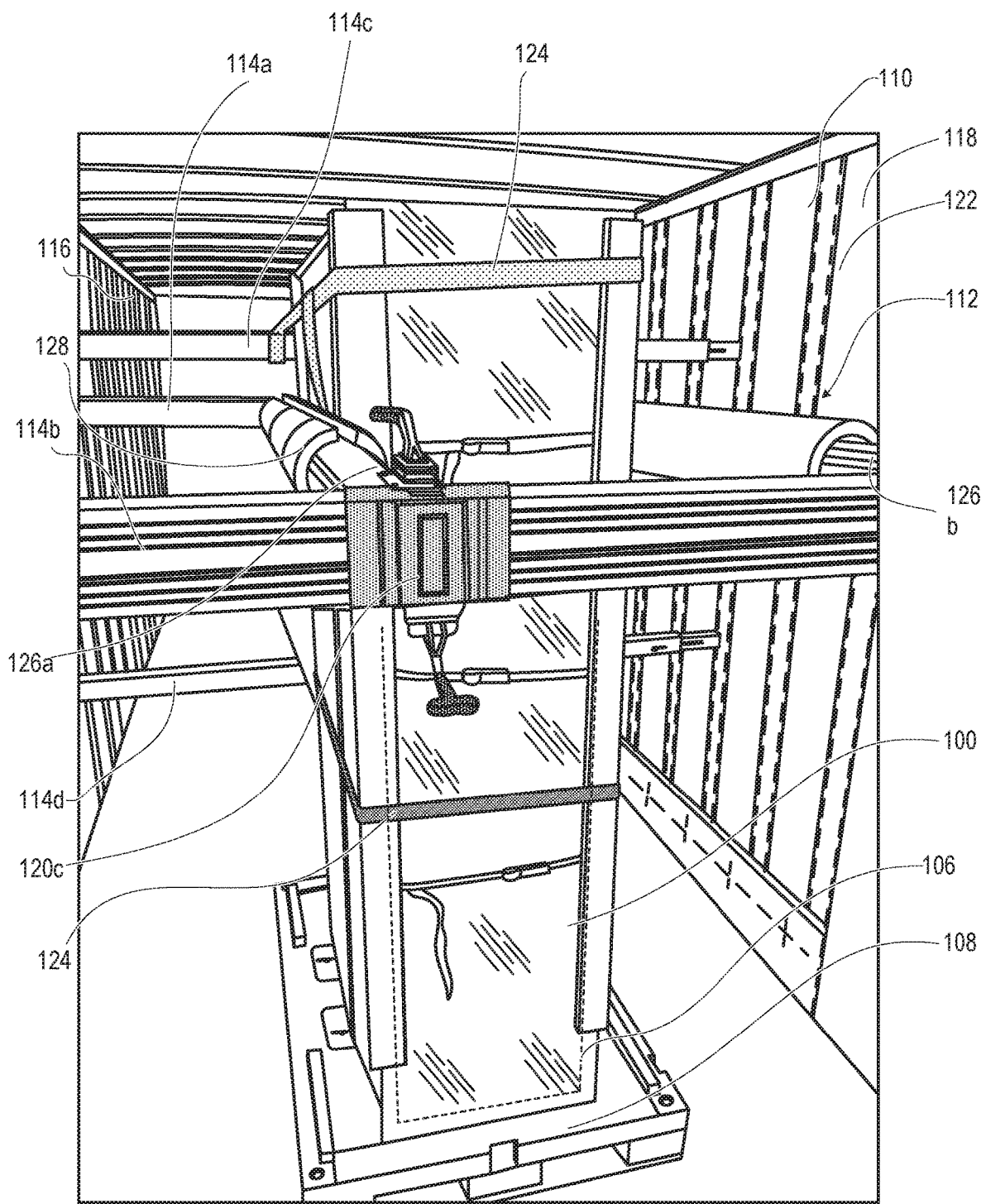
FIG. 1 illustrates a perspective view of a shipping apparatus securing an equipment rack in a carrier shipping enclosure, according to one or more embodiments.

According to one or more aspects of the present innovation, an equipment rack shipping apparatus expedites and enforces correct installation of structures that secure equipment racks during transportation. The shipping apparatus enables packing of the equipment racks in a truck or other shipping conveyance with adequate support while maximizing truck volume with distributed load across the truck bed. The shipping apparatus secures the racks at points of structural stability that avoid delicate equipment and cabling. The shipping apparatus is readily adjustable to fit a variety of shapes and quantities of equipment racks. The shipping apparatus may be collapsed into a minimal volume when not in use.

In an exemplary embodiment, a clamping device of the equipment rack shipping apparatus can be secured along the length of a logistics bar and provide a mounting point for a second bar orthogonal to the first logistics bar. The clamping device can be adjusted along the logistics bar to provide a customized fit to a variety of equipment racks. The resulting combination of clamping devices and (lateral and longitudinal) logistic bars can eliminate more than half of the packaging cost that are currently required. In particular, use of disposable or short-service life packaging is eliminated, providing an ecologically friendly solution for the environment. The shipping apparatus can be used without a requirement for storage shells that enclose the equipment rack during shipping. Eliminating the requirement for storage shells avoids the space-consuming transportation and storage requirement for the storage shells between uses. Personnel or automated means that prepare the equipment racks for shipping are provided a set of devices that lend themselves to repeatable correct installation in a carrier shipping enclosure such as a truck or shipping container. Based on experience using a prototype version of the shipping apparatus, the time required for preparing rack enclosures for shipping can be reduced by approximately 75%.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is designated by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example IHS 100 that includes servers, switches, power, cooling and other information technology (IT) equipment installed into a rack frame and interconnected with communication and power cabling to form a fully integrated equipment rack 106 (shown in phantom). The equipment rack 106 is placed on, and fastened to, a shock pallet 108 for shipping. When placed in a carrier shipping enclosure 110 such as truck, trailer, or shipping container, an equipment rack shipping apparatus 112 secures the equipment rack 106 in place. The equipment rack shipping apparatus 112 provides standardized secure attachment without a tendency to over tighten attachment points that could damage sensitive IT equipment. In addition, the equipment rack shipping apparatus 112 mitigates any tendency to loosely secure the equipment rack 106 and properly secures the equipment rack 106 in place such that swaying during shipping and the potential for damage from such swaying are substantially eliminated.

For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In one or more embodiments, the equipment rack shipping apparatus 112 includes a front and a rear lateral logistic bar 114a, 114b, each having a length to perpendicularly extend between opposing left and right lateral interior sides 116, 118 of the carrier shipping enclosure 110. Four clamping devices 120a-120d (FIG. 3) are used for each equipment rack 106. Clamping devices 120a-120b respectively are mounted as a front left and right pair on the front lateral logistic bar 114a. Clamping devices 120c-120d (FIG. 3) respectively are mounted as a rear left and right pair on the rear lateral logistic bar 114b. Each clamping device 120a-120d is proximate to a respective corner of an equipment rack 106 placed in the carrier shipping enclosure 110 for transport.

For simplicity in describing the functional aspects of the disclosure, the equipment racks are presented as having a substantially rectangular peripheral/exterior shape, lending itself to being secured in a similarly-shaped configuration of logistics bars and clamping devices. However, it is appreciated that the functional aspects of the disclosure are fully applicable to other shapes of equipment racks. Additionally, the features and functionality of the disclosed shipping apparatus can be utilized for other types of shipping products, and not limited in any way to use with an information technology (IT) rack.

In an exemplary embodiment, attachment points for lateral logistic bars 114a, 114b on the lateral interior sides 116, 118 are vertical tracks 122 spaced longitudinally farther apart than the longitudinal dimension of the equipment rack 106. In an exemplary use, equipment racks 106 are placed in contact with, or against, resilient padding on the front lateral logistic bar 114a. For resisting backward swaying of the equipment rack 106, a cargo strap 124 is attached around the lateral sides and back of the equipment rack 106. FIG. 1 illustrates the cargo strap 124 attached to another higher lateral logistic bar 114c attached above the front lateral logistic bar 114a. Another cargo strap 124 is attached to a lower lateral logistic bar 114d to distribute loads on the equipment rack 106. A cargo strap 124 can additionally or alternatively be attached to the front lateral logistic bar 114a. To resist lateral swaying, a pair of left and right longitudinal logistic bars 126a-126b are engaged between left side clamping devices 120a, 120c and right side clamping devices 120b, 120d respectively. In one embodiment, cylindrical foam tubes 128 for resilient padding are lengthwise split for mounting onto a respective longitudinal logistic bar 126a-126b after installation.

For clarity, an equipment rack 106 is depicted and described as having a horizontal rectangular cross section that can be closely positioned to a front lateral logistic bar 114a and left and right longitudinal logistic bars 126a-126b. Depending on attachment points within the carrier shipping enclosure 110, the rear lateral logistic bar 114b can be positioned against or close to a rear side of the equipment rack 106 with additional support provided by a cargo strap 124 in lieu of proximity to the rear lateral logistic bar 114b. However, the equipment rack shipping apparatus 112 can support tall cargo items that have other horizontal cross sectional shapes. Additional padding can be inserted so that any swaying of the tall cargo item is not concentrated on a small area.

Figure 2:
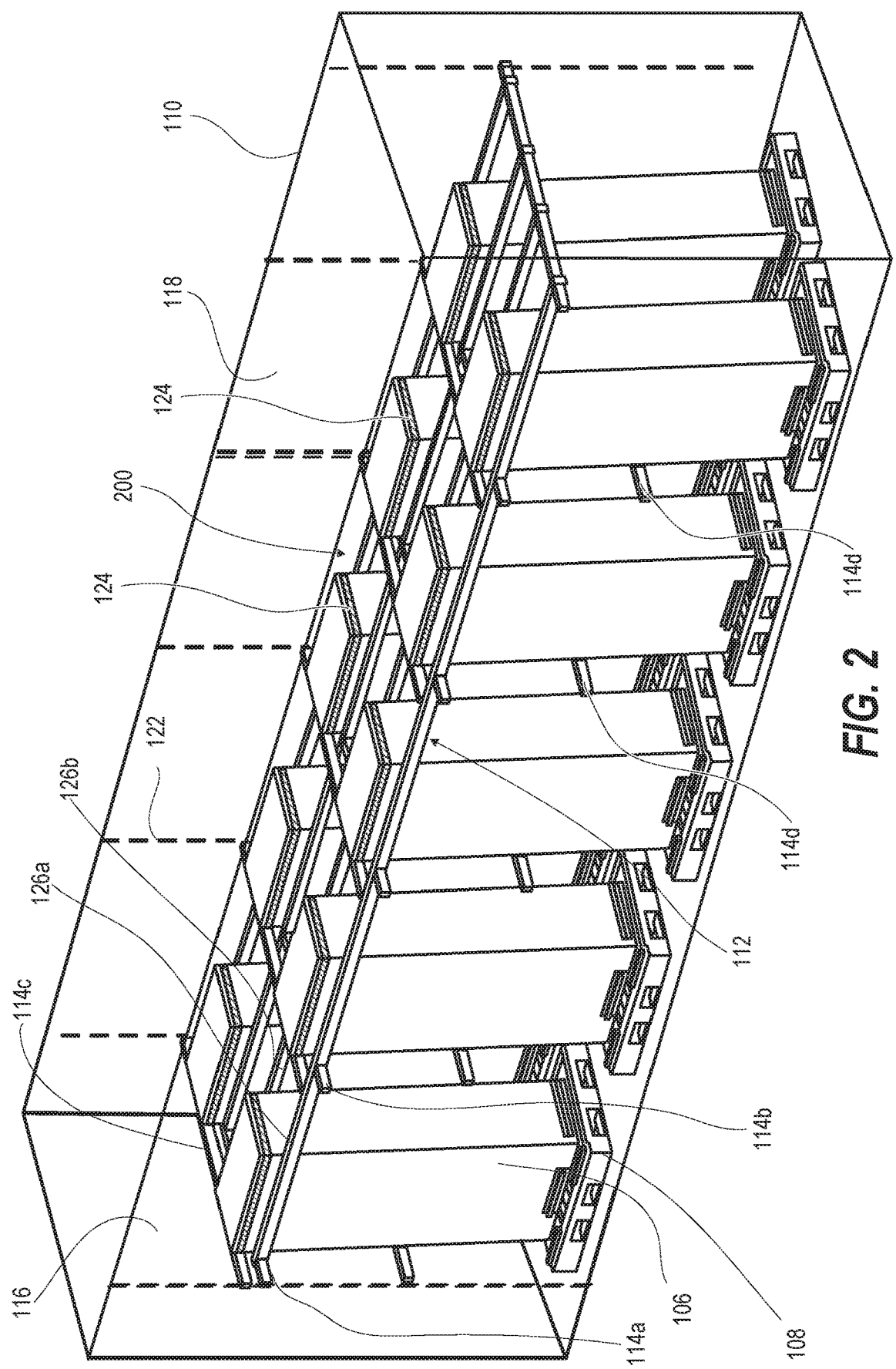
FIG. 2 illustrates a partially cutaway, isometric view of the carrier shipping enclosure of FIG. 1 that contains a lattice of shipping apparatuses, according to one or more embodiments.
Figure 3:
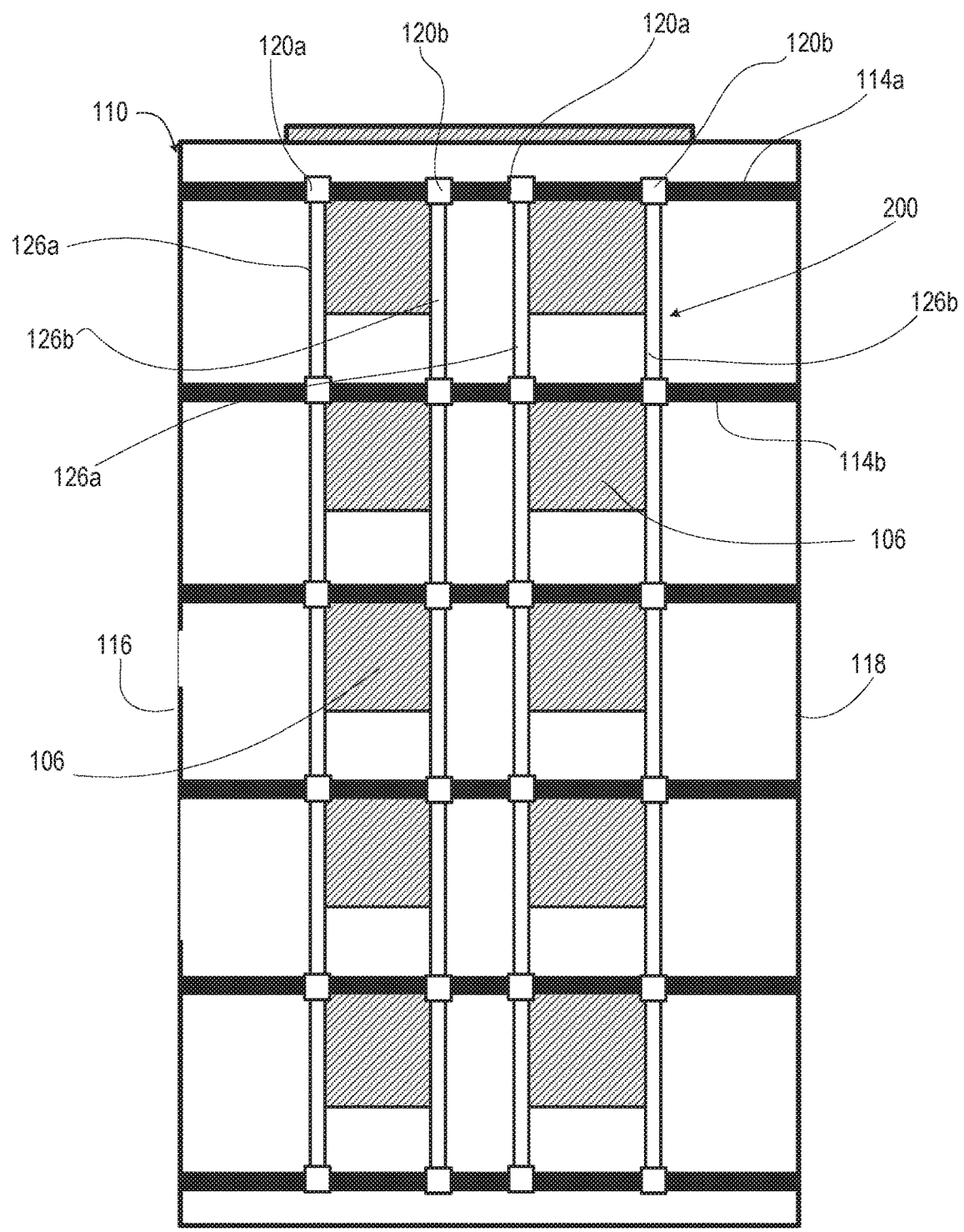
FIG. 3 illustrates a top view diagram of the lattice of shipping apparatuses of FIG. 2, according to one or more embodiments.

FIGS. 2-3 illustrate a lattice 200 formed from clamping devices 120a-120d (FIG. 3) that each support two longitudinal logistic bar 126a-126b on front and back sides respectively. FIG. 2 illustrates an upper lateral logistic bar 114c that is positioned above each front lateral logistic bar 114a to support a respective cargo strap 124. A lower lateral logistic bar 114d is positioned below each front lateral logistic bar 114a to assist in resisting any forward movement of the respective equipment rack 106. Lateral logistic bars 114a-114d are mounted to vertical tracks 122. Clamping devices 120a-120b accommodate lateral spacing by being laterally adjustable on a selected lateral logistic bar 114a, 114b. Lateral spacing can be dictated by one or more of the lateral size of the equipment rack 106, width of the shock pallet 108, and required lateral load spacing for the carrier shipping enclosure 110. The length of the longitudinal logistic bars 126a-126b, either as procured or as adjusted, accommodates the longitudinal size of the equipment rack 106, length of the shock pallet 108.

Figure 4:
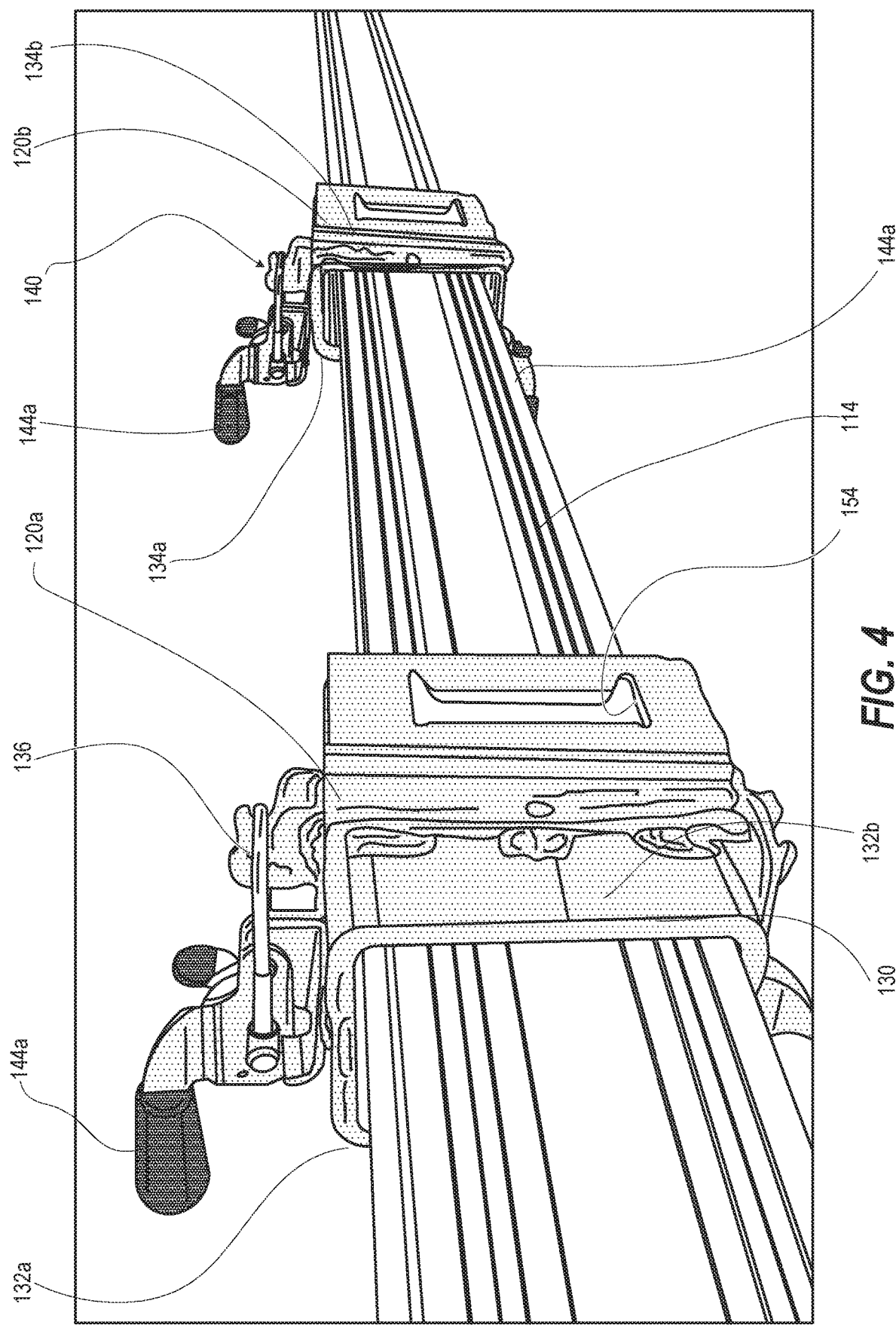
FIG. 4 illustrates a perspective view of two example clamping devices mounted on a lateral logistic bar of the shipping apparatus of FIG. 1, according to one or more embodiments.

FIG. 4 illustrates example clamping devices 120a-120b mounted on a lateral logistic bar 114. Each clamping device 120a-120b includes a gripping portion 130 having first and second surfaces 132a, 132b positionable along opposing front and back sides of the lateral logistic bar 114. The gripping portion 130 of each clamping device 120a-120b includes first and second sections 134a-134b that include the first and second surfaces 132a, 132b respectively. First and second sections 134a-134b have a channel shape that together closely approximates at least a portion of a transverse cross sectional shape of the lateral logistic bar 114. In an exemplary embodiment, the lateral logistic bar 114 has a rectangular transverse cross section. With this embodiment, the first and second sections 134a-134b are respectively front and back halves of the gripping portion 130 having a corresponding rectangular shape divided on top and bottom. A clamp mechanism 136 is attached to the gripping portion 130 for movement between a disengaged position 138 (FIG. 5) and an engaged position 140 (FIG. 4) to selectively engage the first and second surfaces 132a, 132b of the gripping portion 130 to the opposing front and back sides of the lateral logistic bar 114.

Figure 5:
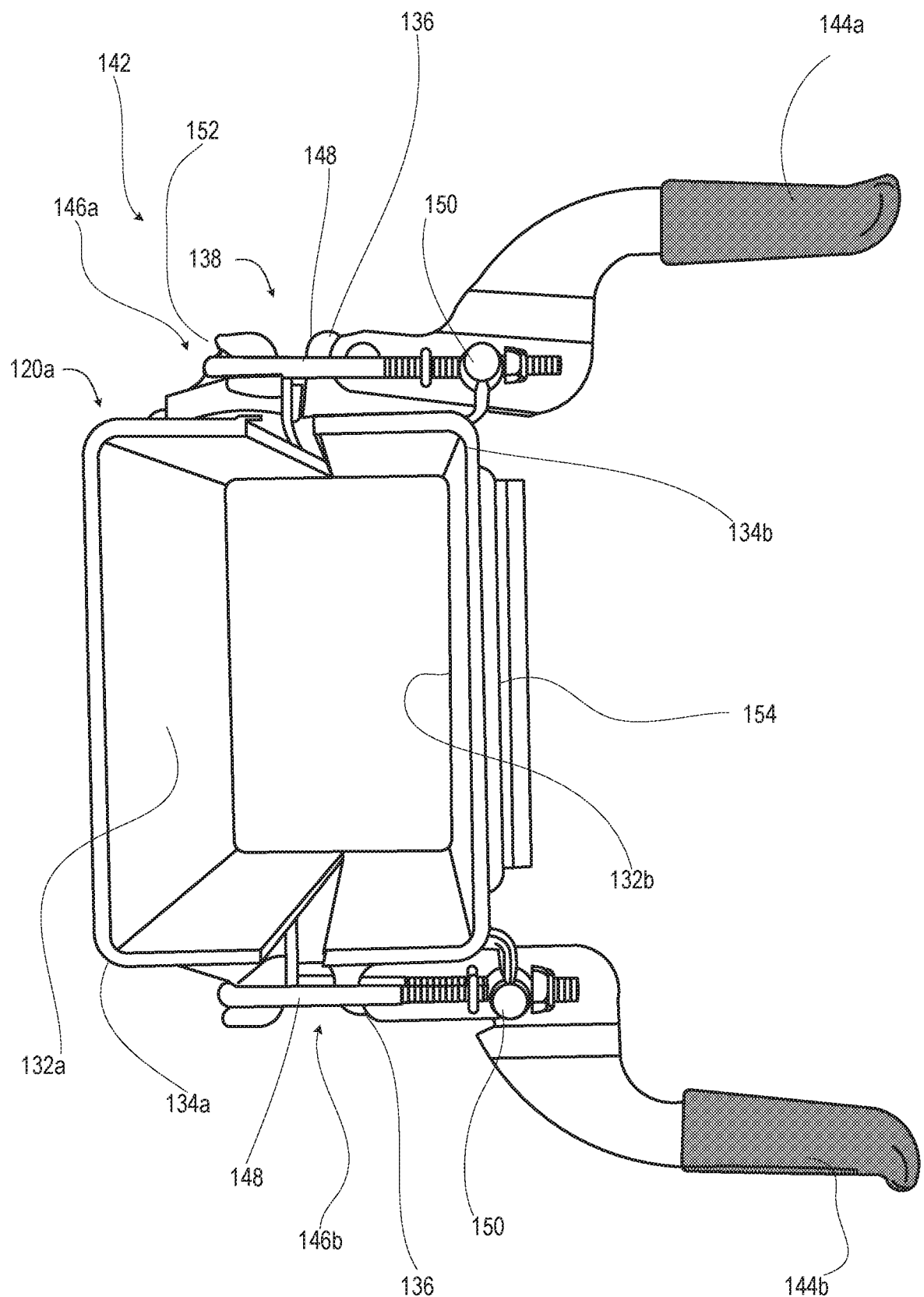
FIG. 5 illustrates a side perspective view of the example clamping device of FIG. 4, according to one or more embodiments.

FIGS. 4-5 illustrate a clamping mechanism 142 having first and second sections 134a-134b and two actuators, specifically rotatably attached handles 144a-144b, that bring the first and second sections 134a-134b together to frictionally engage first and second surfaces 132a, 132b against the lateral logistic bar 114. In particular, top and bottom box latches 146a, 146b of the clamping mechanism 142 are opened and closed respectively by the handles 144a-144b, respectively. FIG. 5 illustrates that spacing between the first and second sections 134a-134b can be adjusted by a threaded attachment of a bail latch 148 to a rotating pin 150 through the respective handle 144a-144b, which is pivotally attached to the second section 134b. A latch hook 152 receives the bail latch 148. A mounting feature, such as a mounting receptacle 154, is formed in the back-facing side of the second section 134b to receive one end of a longitudinal logistic bar 126a-126b (FIG. 1).

Figure 6:
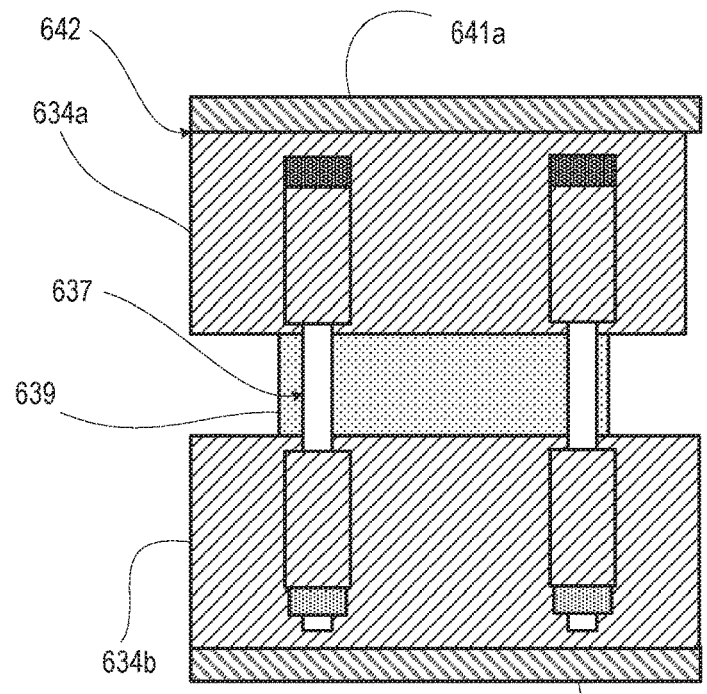
FIG. 6 illustrates a top view of an example clamping device.
Figure 7:
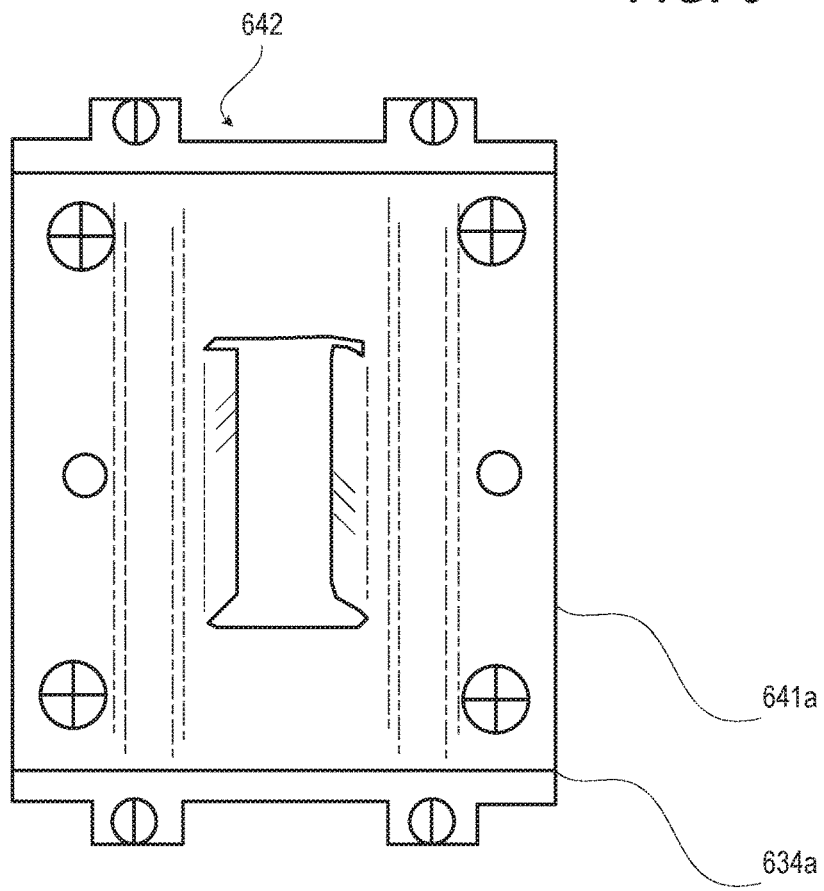
FIG. 7 illustrates a front view of the example clamping device of FIG. 6, according to one or more embodiments.
Figure 8:
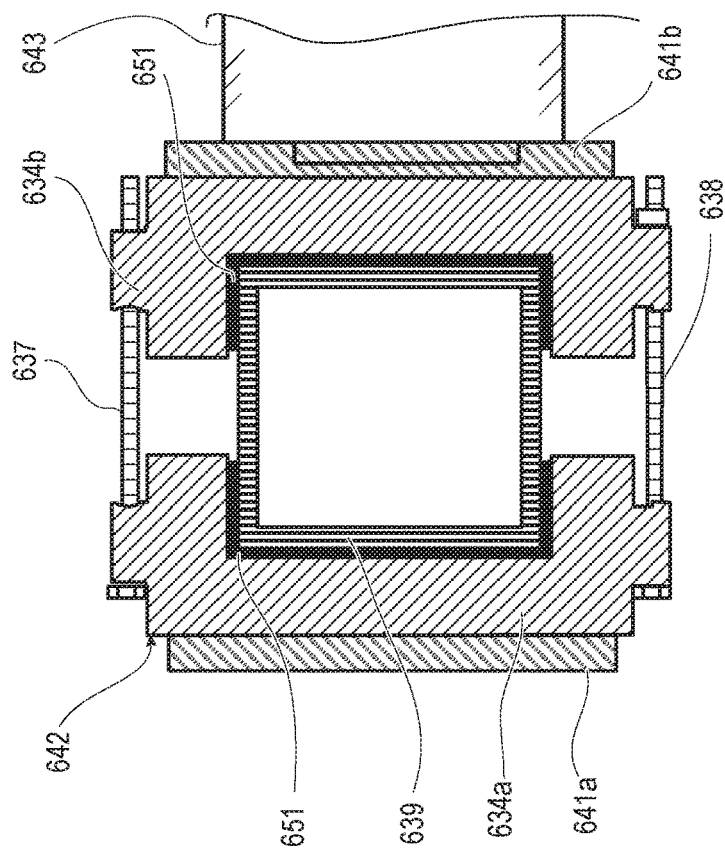
FIG. 8 illustrates a left side view of the example clamping device of FIG. 6, according to one or more embodiments.

FIGS. 6-8 illustrate an example clamping mechanism 642 having first and second U-shaped sections 634a-634b fastened together by a top pair of bolts 637 and a bottom pair of bolts 638 to clamp on opposing front and back sides of a lateral logistics bar 639. With particular reference to FIG. 7, vertical E-track plates 641a, 641b are fastened to a front and back side respectively of the first and second U-shaped sections 634a-634b for clipping in lateral logistics bars 643 (FIG. 8). Other clamping devices can be used such as toggle clamps, spring clamps, etc. With particular reference to FIG. 8, the clamping mechanism 642 can slide along the lateral logistics bar 639 until secured. The clamping mechanism 642 can then be secured at a lateral location appropriate to secure a particular palletized IHS, resisting load forces caused by momentum of the palletized IHS (not shown). Clamp mechanism 642 includes a compliant feature 651 of foam or rubber to spread out the clamping load and increase the friction between the clamp mechanism 642 and the lateral logistics bar 639. In other embodiments, the first and second U-shaped sections 634a-634b can be attached together, such as a hinged front attachment.

Figure 9:
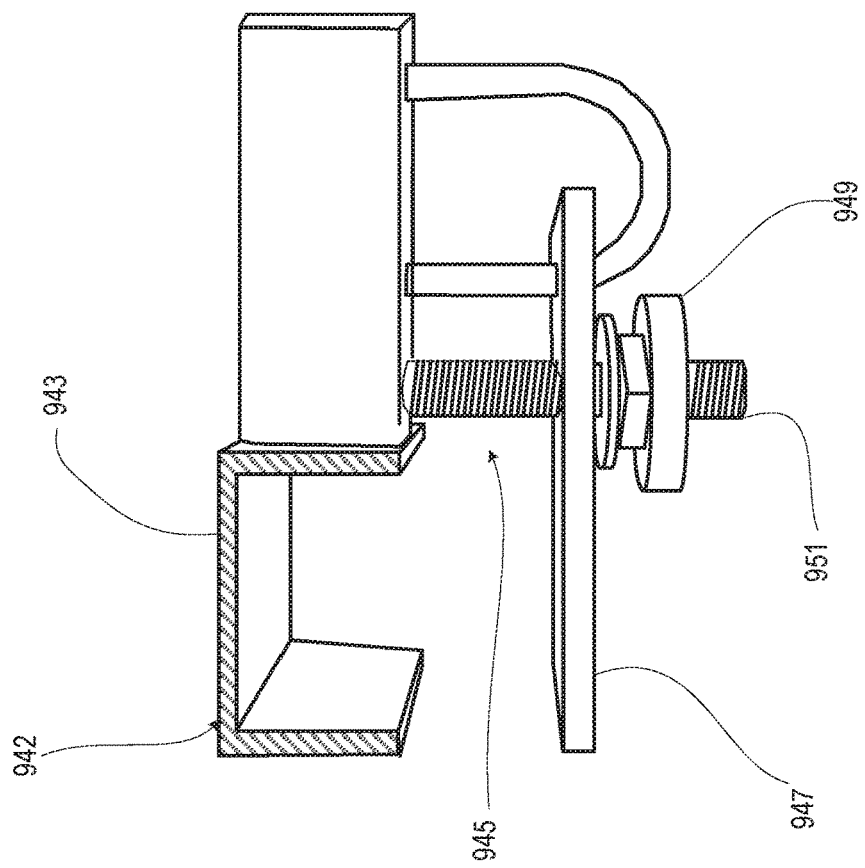
FIG. 9 illustrates a left side view of an example clamping device, according to one or more embodiments.

FIG. 9 illustrates an example clamping mechanism 942 having an upper half-channel shaped member 943 with a lower clamping jaw member 945 formed by a horizontal plate 947 pulled upward by a bottom nut assembly 949 received on a vertical threaded rod 951 extending downward from the upper half-channel shaped member 943. E-track features can be mounted on the clamping mechanism 942 for receiving a longitudinal logistics or tactical bar (not shown).

Figure 10:
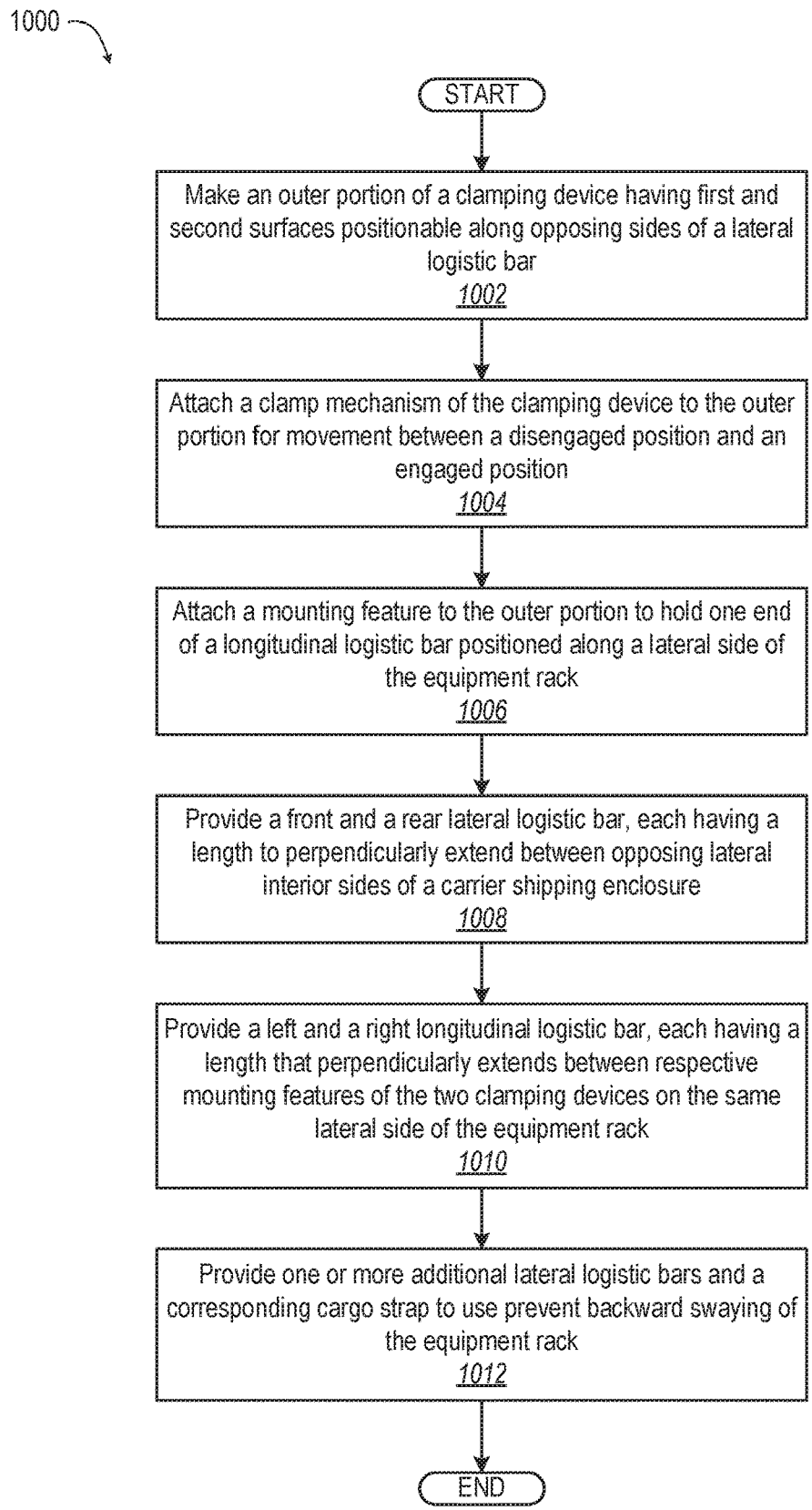
FIG. 10 illustrates a flow diagram of a method of making and assembling a shipping apparatus for securing an equipment rack in a carrier shipping enclosure, according to one or more embodiments.
Figure 11:
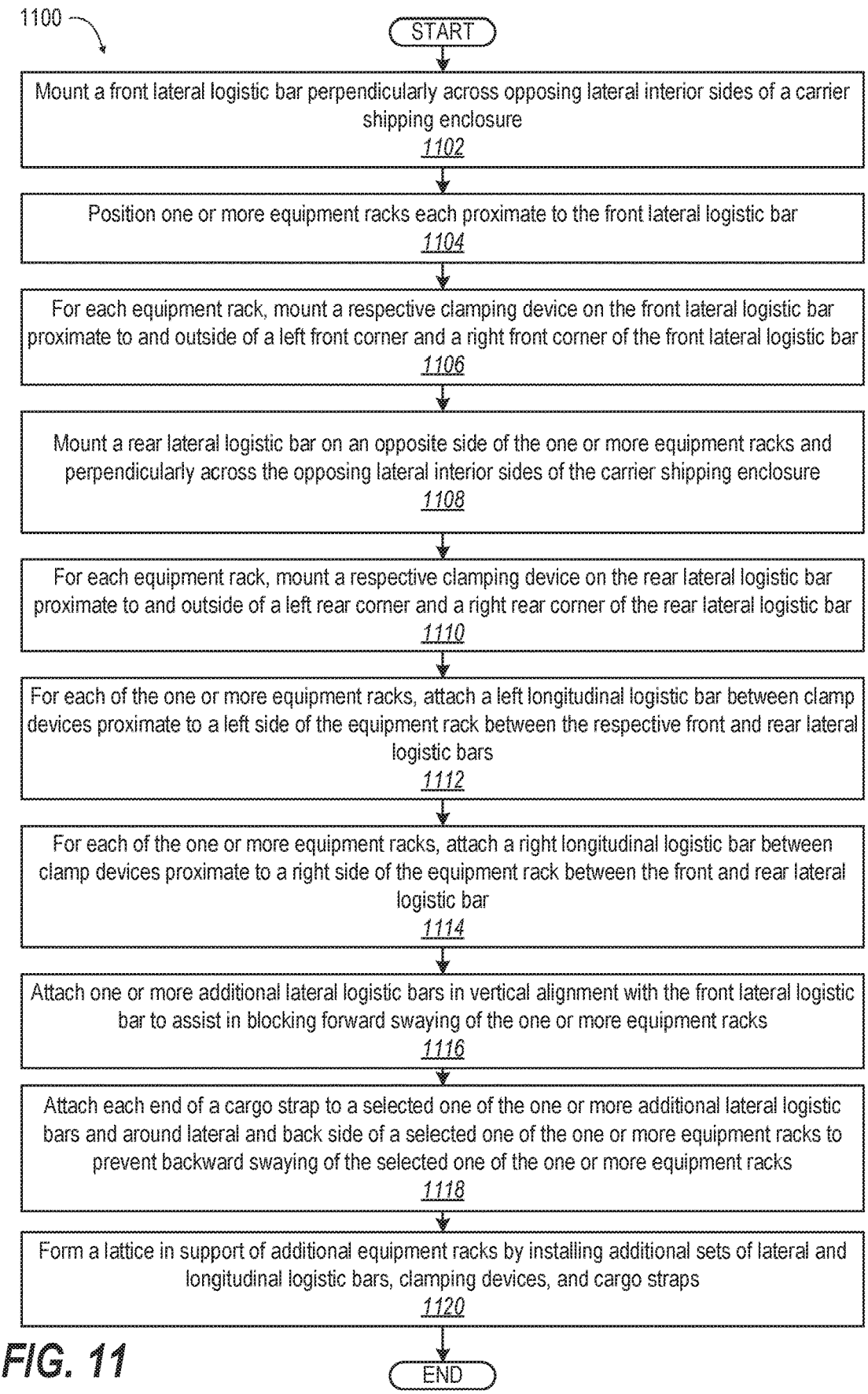
FIG. 11 illustrates a flow diagram of a method of securing an equipment rack in a carrier shipping enclosure using the shipping apparatus, according to one or more embodiments.
Figure 12:
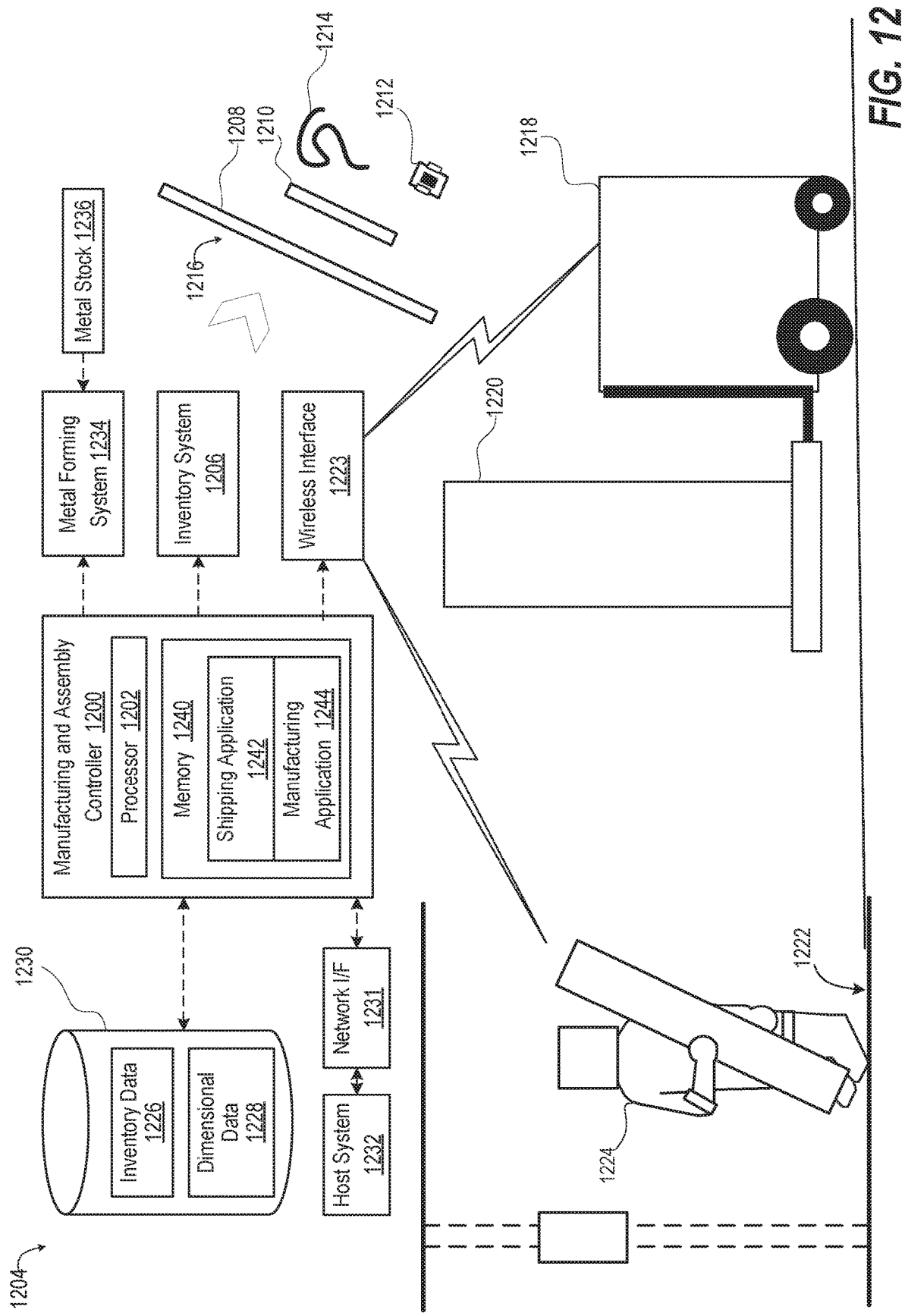
FIG. 12 illustrates a functional block diagram of a manufacturing and assembly system for providing a shipping apparatus to secure an equipment rack in a carrier shipping enclosure, according to one or more embodiments.

FIGS. 10-11 illustrate flowcharts of exemplary methods 1000, 1100 by which an automated manufacturing and assembly controller 800 (FIG. 12) performs different aspects of the processes that enable the one or more embodiments of the disclosure. Generally, methods 1000, 1100 represent a computer-implemented method. The description of methods 1000, 1100 are provided with general reference to the specific components illustrated within FIG. 8. Generally methods 1000, 1100 are described as being implemented via processor 1202 (FIG. 12). The methods 1000, 1100 thereby provide automated manufacturing and assembling of a shipping apparatus. It is however appreciated that certain aspects of the described methods may be implemented via other processing devices and/or execution of other code.

FIG. 10 illustrates a method 1000 of providing a shipping apparatus that secures equipment racks in a carrier shipping enclosure for transport. In one or more embodiments, the method 1000 includes making a gripping portion of a clamping device having first and second surfaces positionable along opposing sides of a lateral logistic bar (block 1002). In one or more embodiments, the gripping portion includes two halves that come together along top and bottom to form a rectangular sleeve. The rectangular sleeve can be formed by cutting sections of large rectangular tube stock into sections and then splitting lengthwise on opposing sides. The rectangular sleeve can be formed from bar stock that is cut to a length of half of the circumference of the lateral logistic bar. The cut portion has a center portion sized for a vertical height of a lateral logistic bar and having two 90° lengthwise bends at each end. The bent ends are aligned respectively to encompass the top and bottom portions of the lateral logistic bar. Each bent end is half or less of the width of the lateral logistic bar. The method 1000 includes attaching a clamp mechanism of the clamping device to the gripping portion for movement between a disengaged position and an engaged position (block 1004). In one or more embodiments, the clamp mechanism are top and bottom box latches. Movement of the clamp mechanism selectively engages the first and second surfaces of the clamping device to the opposing sides of the respective one of the front and rear lateral logistic bars positioned adjacent to an equipment rack within a carrier shipping enclosure.

An amount of metal-on-metal clamping surface is provided by dimensions of the lateral logistic bar and a length of the clamping device as well as the mechanical advantage of the clamp mechanism providing a required amount of frictional engagement. Additional locking strength can be provided by roughening the contacting surfaces or creating an interlocking pattern that resists lateral movement with the clamp mechanism keeping the two surfaces interlocked.

Method 1000 includes attaching a mounting feature to the gripping portion to hold one end of a longitudinal logistic bar positioned along a lateral side of the equipment rack (block 1006). In one or more embodiments, the mounting feature is a mount receptacle shaped to receive an end of a lateral logistic bar. The method 1000 includes making a front and a rear lateral logistic bar, each having a length to perpendicularly extend between opposing lateral interior sides of a carrier shipping enclosure (block 1008). The method 1000 includes making a left and a right longitudinal logistic bar, each having a length that perpendicularly extends between respective mounting features of the two clamping devices on the same lateral side of the equipment rack (block 1010). The method includes making one or more additional lateral logistic bars and a corresponding cargo strap to use to prevent backward swaying of the equipment rack (block 1012). Then method 1000 ends.

FIG. 11 illustrates a method 1100 of securing equipment racks in a carrier shipping enclosure for transport using the shipping apparatus provided herein. In one or more embodiments, the method 1100 includes mounting a front lateral logistic bar perpendicularly across opposing lateral interior sides of a carrier shipping enclosure (block 1102). The method 1100 includes positioning one or more equipment racks each proximate to the front lateral logistic bar (block 1104). Method 1100 includes, for each equipment rack, mounting and clamping a respective clamping device on the front lateral logistic bar proximate to and outside of a left front corner and a right front corner of the front lateral logistic bar (block 1106). Method 1100 includes mounting a rear lateral logistic bar on an opposite side of the one or more equipment racks and perpendicularly across the opposing lateral interior sides of the carrier shipping enclosure (block 1108). Method 1100 includes, for each equipment rack, mounting and clamping a respective clamping device on the rear lateral logistic bar proximate to and outside of a left rear corner and a right rear corner of the rear lateral logistic bar (block 1110). The method 1100 includes, for each of the one or more equipment racks, attaching a left longitudinal logistic bar between clamp devices proximate to a left side of the equipment rack between the respective front and rear lateral logistic bars (block 1112). The method 1100 includes, for each of the one or more equipment racks, attaching a right longitudinal logistic bar between clamp devices proximate to a right side of the equipment rack between the front and rear lateral logistic bar (block 1114). Method 1100 includes attaching one or more additional lateral logistic bars in vertical alignment with the front lateral logistic bar to assist in blocking forward swaying of the one or more equipment racks (block 1116). Method 1100 includes tightly attaching each end of a cargo strap to a selected one of the one or more additional lateral logistic bars and around the lateral and back side of a selected one of the one or more equipment racks to prevent backward swaying of the selected one of the one or more equipment racks (block 1118). Method includes forming a lattice in support of additional equipment racks by installing additional sets of lateral and longitudinal logistic bars, clamping devices, and cargo straps (block 1120). Then method 1100 ends.

In the above described flow charts of FIGS. 10-11, one or more of the methods may be embodied in an automated manufacturing system that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is designated only by the appended claims.

FIG. 12 illustrates a manufacturing and assembly controller 1200, which has a processor 1202 that configures a manufacturing and assembly system 1204 for inventory control of an automated inventory system 1206. The automated inventory system 1206 contains lateral and longitudinal logistic bars 1208, 1210, clamping devices 1212812 and cargo straps 1214 that form a shipping apparatus 1216. In one or more embodiments, an autonomous robotic fork lift 1218 can position palletized equipment racks 1220 in a carrier shipping enclosure 1222. Controlled via wireless interface 1223, a mobile robotic operator 1224 can install lateral and longitudinal logistic bars 1208, 1210, clamping devices 1212812 and cargo straps 1214 to secure the positioned palletized equipment racks 1220. The rectangular placement of the lateral and longitudinal logistic bars 1208 lends themselves to automated installation. Placement can be according to a default pattern. Alternatively, processor 1202 can access inventory data 1226 and loading and dimensional data 1228 in a data storage repository 1230 in response to receiving a shipping order via a network interface 1231 from a host system 1232. According to loading dictated by a type of carrier shipping enclosure 1220822 and type of equipment racks 1220818, processor 1202 associates a configuration of the shipping apparatus 1216. In one or more embodiments, the manufacturing and assembly system 1204 can include a metal forming system 1234 that forms a gripping portion of the clamping devices 1212812 from metal stock 1236 and welds on box latches provided from the inventory system 1206. The manufacturing and assembly controller 1200 can include a memory 1240 containing a shipping application 1242 executed by the processor 1202 to load the carrier shipping enclosure 1222. The memory 1240 can also include a manufacturing application 1244 executed by the processor 1202 to make the lateral and longitudinal logistic bars 1208, 1210, clamping devices 1212812 and cargo straps 1214.814.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A clamping device for securing an equipment rack during shipping, the clamping device comprising:
   a gripping portion having first and second sections with respective first and second interior surfaces positionable along opposing sides of a lateral logistic bar;
   a clamp mechanism attached to the gripping portion and having two actuators that operate together to bring the first and second sections of the gripping portion together to frictionally engage the respective first and second interior surfaces against the lateral logistic bar, the two actuators being attached to a respectively one of a top and a bottom exterior surface of a same one of the first and second sections and enabling movement of the clamp mechanism between a disengaged position and an engaged position to selectively engage the first and second interior surfaces to the opposing sides of the lateral logistic bar positioned adjacent to one side of the equipment rack within a carrier shipping enclosure;

the gripping portion further comprising a rectangular shape divided on top and bottom into the two sections, at least one of the two sections having a latch hook attached thereto and extending from each of the top and the bottom exterior surfaces opposed from the clamp mechanism; and at least one mounting feature attached to an exterior surface of and extending in a longitudinal direction away from at least one of the first and the second sections of the gripping portion to hold one end of a longitudinal logistic bar positioned along a next side of the equipment rack, the at least one mounting feature comprising a first mount receptacle, the longitudinal logistic bar being separate from the clamping device and extending between and directly/physically interconnecting with the mounting feature of the clamping device and a second mounting feature of a second clamping device to provide lateral support to the equipment rack.

2. The clamping device of claim 1, wherein the clamp mechanism comprises top and bottom box latches.

3. A clamping device for securing an equipment rack during shipping, the clamping device comprising:

a gripping portion having first and second sections with respective first and second interior surfaces positionable along opposing sides of a lateral logistic bar;

a clamp mechanism attached to the gripping portion and having two actuators that operate together to bring the first and second sections of the gripping portion together to frictionally engage the respective first and second interior surfaces against the lateral logistic bar, the two actuators being attached to a respectively one of a top and a bottom exterior surface of a same one of the first and second sections and enabling movement of the clamp mechanism between a disengaged position and an engaged position to selectively engage the first and second interior surfaces to the opposing sides of the lateral logistic bar positioned adjacent to one side of the equipment rack within a carrier shipping enclosure; and at least one mounting feature attached to an exterior surface of and extending in a longitudinal direction away from at least one of the first and the second sections of the gripping portion to hold one end of a longitudinal logistic bar positioned along a next side of the equipment rack, the at least one mounting feature comprising a first mount receptacle, the longitudinal logistic bar being separate from the clamping device and extending between and directly/physically interconnecting with the mounting feature of the clamping device and a second mounting feature of a second clamping device to provide lateral support to the equipment rack;

wherein the at least one mounting feature comprises both the first mounting receptable and a back mounting receptacle to form a lattice of lateral logistic bars to support equipment racks spaced longitudinally in the carrier shipping enclosure.

4. The clamping device of claim 1, wherein the two actuators are rotatably attached handles.

5. The clamping device of claim 2, wherein the top and bottom box latches of the clamp mechanism are opened and closed respectively by the handles, respectively.

6. The clamping device of claim 4, wherein a spacing between the first and second sections is adjustable by a threaded attachment of a bail latch to a rotating pin through a respective one of the handles, which is pivotally attached to the second section.

7. The clamping device of claim 1, wherein the clamp mechanism is slidably engageable on the lateral logistic bar until the actuators of the clamp mechanism, attached to a first one of the first and second sections, are engaged with latch hooks attached to a next one of the first and second sections.

* * * * *